H. NORTHWOOD.
PROCESS OF PRODUCING GLASSWARE PRESENTING BRECCIATED MARBLE EFFECTS.
APPLICATION FILED JAN. 30, 1917.
1,229,315. Patented June 12, 1917.
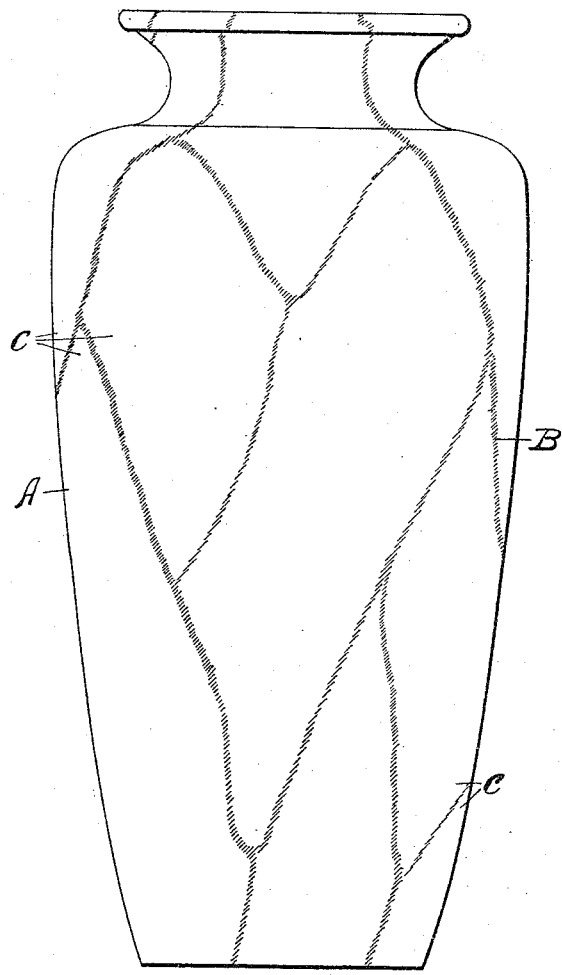
INVENTOR—
Harry Northwood.
By W. E. Dunlap
ATTORNEY.

UNITED STATES PATENT OFFICE.

HARRY NORTHWOOD, OF WHEELING, WEST VIRGINIA.

PROCESS OF PRODUCING GLASSWARE PRESENTING BRECCIATED-MARBLE EFFECTS.

1,229,315.   Specification of Letters Patent.   Patented June 12, 1917.

Application filed January 30, 1917. Serial No. 145,436.

*To all whom it may concern:*

Be it known that I, HARRY NORTHWOOD, a citizen of the United States of America, and resident of Wheeling, county of Ohio, and State of West Virginia, have invented certain new and useful Improvements in Processes of Producing Glassware Presenting Brecciated-Marble Effects, of which the following is a specification.

This invention relates to a process or method of producing glassware presenting brecciated effects in imitation of brecciated marble, and it has for its object to provide a process for the treatment of articles of glassware whereby such articles are given the appearance of being carved from a block of high-grade marble of that variety which consists of angular fragments cemented together by a calcareous paste or matrix of a contrasting color, the lines of fracture being distinctly visible and appearing as finely traced irregular vein-like lines or markings of color.

In carrying out the invention, the product of which is necessarily illustrated more or less imperfectly in the accompanying drawing, in which the figure is a side elevation of a vase made in accordance with the invention, I first take a formed article A of glassware composed of opaque glass, preferably white in color, and subject the same to a treatment whereby its surface is rendered dull and lusterless and whereby is produced a surface texture similar to that of carved or sculptured statuary marble. Fair results may be obtained by sand-blasting the surface, but I prefer to accomplish the result by treating the article to the etching-like effects of a hydrofluoric acid bath, or of a bath in a compound including said acid and commonly known to the glass trade as white acid.

I then trace upon the surface of the article so treated, as by means of a stippling brush, a series or network of irregular fine lines B in a color contrasting with that of the glass, preferably gray, black, or blue, said lines being scattered and so disposed relatively as to simulate intersecting discolored lines of fracture, whereby is imparted to the article the appearance that the same is composed of numerous irregularly shaped cemented fragments C.

For tracing said lines, any suitable glass paint or coloring material may be used.

The article is finally fired, as in a leer, to a temperature which causes the applied lines of glass color to become fixed on the glass.

The article so produced is distinctively handsome in appearance, simulating almost perfectly certain high-grade unpolished brecciated marble, and presenting the appearance of having been carved from a solid block of such marble.

As used herein, the term "opaque glass" is intended to include semi-opaque, translucent, opalescent and various other non-transparent glasses of uniform color and texture throughout, the best results being obtained, however, through the use of a white glass of a relatively moderate degree of opacity.

What is claimed is—

1. The process of producing glassware presenting brecciated marble effects, which consists in treating a formed article of opaque glass to produce a dull lusterless surface of approximately the texture of carved statuary marble, then tracing upon said surface in a contrasting color a network of irregular fine lines which are so disposed relatively as to intersect one with another at divers angles and to simulate discolored lines of fracture defining numerous irregularly shaped component fragments.

2. The process of producing glassware presenting brecciated marble effects, which consists in treating a formed article of opaque glass to produce a dull lusterless surface of approximately the texture of carved statuary marble, then tracing upon said surface in a contrasting color a network of irregular fine lines having a relatively scattered arrangement in which they intersect one with another to define numerous variform fragmentary blocks or patches in similitude to discolored or calcareous lines of fracture of brecciated marble, and finally firing the article to fix the applied lines thereon.

3. The process of producing glassware presenting brecciated marble effects, which consists in treating a formed article of opaque glass to a corrosive liquid bath to produce a dull lusterless marble-like surface, then applying to said surface a network of lightly traced lines in glass color, said lines being distributed scatteringly and in such relation that they intersect at divers angles, simulating the fragment-defining fractures presented by brecciated marble, and finally firing the article to fix said lines thereon.

4. The process of producing glassware presenting brecciated marble effects, which consists in treating a formed article of opaque glass to the corrosive effects of a hydrofluoric acid bath for producing a dull lusterless surface finish, then applying to said surface a network of finely traced irregular lines in glass color, said lines being distributed scatteringly and in such relation that they intersect at divers angles, said lines simulating the fragment-defining lines of fracture appearing in brecciated marble, and finally firing the article to fix said lines thereon.

In testimony whereof, I affix my signature in presence of two subscribing witnesses.

HARRY NORTHWOOD.

Witnesses:
H. E. DUNLAP,
W. F. KEEFER.